United States Patent
Halford et al.

(10) Patent No.: US 11,203,316 B2
(45) Date of Patent: Dec. 21, 2021

(54) APPARATUS AND METHOD FOR INCIDENT RESPONSE

(71) Applicant: JAGUAR LAND ROVER LIMITED, Coventry (GB)

(72) Inventors: Simon Halford, Warwickshire (GB); Callum Hubbard, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 161 days.

(21) Appl. No.: 16/481,134

(22) PCT Filed: Dec. 8, 2017

(86) PCT No.: PCT/EP2017/082008
§ 371 (c)(1),
(2) Date: Jul. 26, 2019

(87) PCT Pub. No.: WO2018/137829
PCT Pub. Date: Aug. 2, 2018

(65) Prior Publication Data
US 2019/0381964 A1   Dec. 19, 2019

(30) Foreign Application Priority Data
Jan. 26, 2017   (GB) ..................... 1701283

(51) Int. Cl.
*B60R 21/01* (2006.01)
*B60R 21/0136* (2006.01)
(Continued)

(52) U.S. Cl.
CPC ........ *B60R 21/0136* (2013.01); *B60R 25/102* (2013.01); *G06K 9/00832* (2013.01);
(Continued)

(58) Field of Classification Search
CPC .............. B60R 21/0136; B60R 25/102; B60R 2021/0027; H04W 4/44; H04W 4/029;
(Continued)

(56) References Cited

U.S. PATENT DOCUMENTS 9,524,269 B1 * 12/2016 Brinkmann .......... G07C 5/0808
9,652,975 B1 *  5/2017 Riley ................... G08B 25/009
(Continued)

FOREIGN PATENT DOCUMENTS

CN         105005276 A    10/2015
DE      102014005048 A1   11/2014
(Continued)

OTHER PUBLICATIONS

Search and Examination Report, GB1701283.2, dated Jul. 21, 2017.
(Continued)

*Primary Examiner* — Omar Casillashernandez
(74) *Attorney, Agent, or Firm* — McCoy Russell LLP

(57) ABSTRACT

An incident response system for a vehicle, the incident response system comprising: incident detection means, exterior audio detection means, communication means and control means. The incident detection means detects an event indicative of a vehicle incident. The exterior audio detection means detects audio exterior to the vehicle. The communication means operatively supports an audio communication channel with a remote communication means. The control means is arranged to control the communication means in dependence on the detection of an event indicative of a vehicle incident, to establish an audio communication channel between the vehicle and the remote communication means. The control means is operable to cause selective transmission of the audio detected exterior to the vehicle to the remote communication means over the established audio communication channel.

14 Claims, 4 Drawing Sheets

(51) Int. Cl.
*H04W 4/44* (2018.01)
*H04W 4/029* (2018.01)
*B60R 25/102* (2013.01)
*G06K 9/00* (2006.01)
*G07C 5/00* (2006.01)
*G08B 25/00* (2006.01)

(52) U.S. Cl.
CPC ............ *G07C 5/008* (2013.01); *G08B 25/009* (2013.01); *H04W 4/029* (2018.02); *H04W 4/44* (2018.02)

(58) Field of Classification Search
CPC ..... H04W 4/90; G06K 9/00832; G07C 5/008; G08B 25/009; G08B 25/014; G08B 25/016
USPC .......................................................... 701/36
See application file for complete search history.

(56) References Cited

U.S. PATENT DOCUMENTS

| | | | |
|---|---|---|---|
| 2006/0048800 A1* | 3/2006 | Rast | G06F 1/3265 134/56 R |
| 2009/0273673 A1 | 11/2009 | Worley, III et al. | |
| 2014/0035075 A1 | 11/2014 | Gelinske et al. | |
| 2014/0375446 A1* | 12/2014 | Wanami | G08G 1/205 340/436 |
| 2015/0371456 A1 | 12/2015 | Moore et al. | |
| 2016/0029111 A1* | 1/2016 | Wacquant | H04R 3/005 381/71.4 |
| 2016/0093121 A1* | 3/2016 | Singh | H04W 4/90 701/32.3 |

FOREIGN PATENT DOCUMENTS

| | | | |
|---|---|---|---|
| KR | 10-2005-0112932 | * | 12/2005 |
| KR | 20050112932 A | | 12/2005 |

OTHER PUBLICATIONS

International Search Report and Written Opinion, PCT/EP2017/082008, dated Mar. 15, 2018.

China National Intellectual Property Administration, Office Action and Search Report Issued in Application No. 201780083972.3, dated Jan. 29, 2021, 33 pages.

European Patent Office, Office Action Issued in Application No. 17816659.1, dated Jul. 12, 2021, Netherlands, 8 pages.

* cited by examiner

APPARATUS AND METHOD FOR INCIDENT RESPONSE

CROSS-REFERENCE TO RELATED APPLICATIONS

This application is a 371 of International Application No. PCT/EP2017/082008, filed Dec. 8, 2017, which claims priority to GB Patent Application 1701283.2, filed Jan. 26, 2017, the contents of both of which are incorporated by reference herein in their entirety.

TECHNICAL FIELD

The present disclosure relates to apparatus and a method and particularly, but not exclusively, to an apparatus and method for responding to a vehicle incident. Aspects of the invention relate to an incident response system, to a controller to a method, to a vehicle, and to computer software.

BACKGROUND

It is sometimes desired to detect an event indicative of a vehicle incident and establish communication with a remote entity upon detection of the vehicle incident event. For example, if a vehicle is involved in a collision it may be desirable to detect an event indicative of the collision and, in response to the detection, establish audio communication between the vehicle and a remote call centre. A call centre operator may receive audio communicated from the vehicle and may seek to establish information regarding the incident situation from the received audio. The call centre operator may direct one or more emergency response services (e.g. police, fire and/or ambulance services) to respond to the incident accordingly.

Audio, which is communicated to the remote call centre, may comprise audio which is detected interior to the vehicle. This may allow an occupant of the vehicle who is situated inside of the vehicle to communicate with a call centre operator. However, in some vehicle incident situations one or more occupants of the vehicle at the time of the incident event may be situated outside of the vehicle after the occurrence of the incident event. For example, one or more vehicle occupants may have been able to voluntarily leave the vehicle following the collision. This situation is common where incidents occur on busy roads and the occupants seek a place to wait for help on the verge, away from the road, rather than sitting in the damaged car. In such situations, a call centre operator receiving audio detected interior to the vehicle may be unable to communicate with anyone and may not be able to deduce the nature or status of the incident situation.

It is an object of embodiments of the invention to at least mitigate or obviate one or more problems associated with the prior art.

SUMMARY OF THE INVENTION

Aspects and embodiments of the invention provide an incident response system, a vehicle, a controller, a method and computer software.

According to an aspect of the invention there is provided an incident response system for a vehicle, the incident response system comprising: incident detection means arranged to detect an event indicative of a vehicle incident, exterior audio detection means arranged to detect audio exterior to the vehicle, communication means for operatively supporting an audio communication channel with a remote communication means; and control means arranged to control the communication means in dependence on the detection of an event indicative of a vehicle incident, to establish an audio communication channel between the vehicle and the remote communication means, wherein the control means is operable to transmit the audio detected exterior to the vehicle to the remote communication means over the established audio communication channel.

According to a further aspect of the invention there is provided an incident response system for a vehicle, the incident response system comprising: incident detection means arranged to detect an event indicative of a vehicle incident; exterior audio detection means arranged to detect audio exterior to the vehicle; communication means for operatively supporting an audio communication channel with a remote communication means; and control means arranged to control the communication means in dependence on the detection of an event indicative of a vehicle incident, to establish an audio communication channel between the vehicle and the remote communication means, wherein the control means is operable to cause selective transmission of the audio detected exterior to the vehicle to the remote communication means over the established audio communication channel.

A vehicle incident may, for example, be a vehicle emergency such as a vehicle collision, vehicle fire or submergence of a vehicle. A vehicle incident may, for example, be a vehicle fault such as a vehicle breakdown.

Providing a control means which is operable to transmit audio detected exterior to a vehicle to a remote communication means, advantageously allows an operator of the remote communication means (e.g. emergency response personnel) access to improved information regarding the detected vehicle incident. For example, directly following a vehicle incident, one or more occupants of the vehicle may have exited the vehicle, seeking a safe place to call for and await help and may therefore be located exterior to the vehicle when audio communication is established between the vehicle and a remote communication means. In such scenarios, transmitting audio detected exterior to the vehicle to a remote communication means allows an operator of the remote communication means to use the audio detected exterior to the vehicle to assess the severity and nature of the vehicle incident. The operator may direct emergency response services (e.g. fire, police and/or ambulance services) accordingly.

The incident response system may comprise interior audio detection means arranged to detect audio interior to the vehicle. The control means may be arranged to: determine whether a signal level of the audio detected interior to the vehicle is less than a threshold signal level; and transmit the audio detected exterior to the vehicle to the remote communication means in dependence on the signal level of the audio detected interior to the vehicle being less than the threshold signal level.

A determination that a signal level of the audio detected interior to the vehicle is less than the threshold signal level may indicate that no speech of a vehicle occupant is being detected interior to the vehicle. This may indicate that additional information from outside of the vehicle may be useful to an operator of the remote communication means. For example, it may indicate that one or more occupants of the vehicle at the time of the incident are now outside of the vehicle. Transmitting audio detected exterior to the vehicle to a remote communication means in this situation, advantageously allows an operator of the remote communication means to access audio which may provide them with useful information regarding the situation outside of the vehicle. This may allow them to direct emergency response services accordingly.

In some embodiments the control means may only transmit the audio detected exterior to the vehicle to the remote communication means if it is determined that the signal level of the audio detected interior to the vehicle is below the threshold signal level. That is, if it is determined that the signal level of the audio detected interior to the vehicle is greater than the threshold signal level, then the control means may not transmit the audio detected exterior to the vehicle to the remote communication means. The control means may instead only transmit the audio detected interior to the vehicle to the remote communication means.

The control means may be operable to receive a request from the remote communication means for audio detected exterior to the vehicle and transmit the audio detected exterior to the vehicle to the remote communication means in dependence on the request.

An operator of a remote communication means may request audio detected exterior to the vehicle if an assessment is made that the audio will aid in an assessment of the incident situation. For example, an operator of a remote communication means may have access to other sources of information regarding the incident (such as audio detected interior to the vehicle) and may deduce from this information that audio detected exterior to the vehicle may provide useful information for assessing the incident situation. Accordingly the operator of the remote communication means may cause the remote communication means to issue a request for audio detected exterior to the vehicle.

In some embodiments the control means may only transmit the audio detected exterior to the vehicle to the remote communication means if a request is received from a remote communication means. That is, if no request is received from a remote communication means, then the control means may not transmit the audio detected exterior to the vehicle to the remote communication means. The control means may instead only transmit audio detected interior to the vehicle to the remote communication means.

The control means may be arranged to communicate to the remote communication means an indication that audio detected exterior to the vehicle is available.

Communicating an indication that audio detected exterior to the vehicle is available may advantageously assist an operator of the remote communication means to deduce whether additional information via audio detected exterior to the vehicle is available to them in order to assess the nature of the vehicle incident. This may be helpful if the operator of the remote communication means cannot hear any audio detected exterior to the vehicle. The operator may not know whether this is because no significant sound is being generated outside of the vehicle or if audio detected exterior to the vehicle is not available to them. An indication as to whether audio detected exterior to the vehicle is available will assist to clarify the situation.

The control means may be arranged to determine whether the exterior audio detection means is functioning.

During some vehicle incidents it is possible that exterior audio detection means (or another related component) may be damaged and may stop functioning. For example, during a vehicle collision damage may be caused to an exterior audio detection means. Determining whether the exterior audio detection means is functioning, advantageously allows an accurate status of the availability of audio detected exterior to the vehicle to be transmitted to the remote communication means.

Determining whether the exterior audio detection means is functioning may comprise determining whether data is being received from the exterior audio detection means.

The exterior audio detection means may be arranged to periodically transmit data packets to the control means regardless of whether audio detected exterior to the vehicle is being transmitted to the remote communication means. Detecting whether or not data is being received from the exterior audio detection means provides a simple and convenient way by which the availability of exterior audio may be determined.

The control means may be arranged to communicate to the remote communication means an indication that audio detected exterior to the vehicle is available if the control means detects that the exterior audio detection means is functioning and communicate to the remote communication means an indication that audio detected exterior to the vehicle is not available if the control means detects that the exterior audio detection means is not functioning.

As explained above, it may be helpful to an operator of the remote communication means to establish the availability of audio detected exterior to the vehicle. Communicating an indication of the availability of exterior audio based on the functioning of the exterior audio detection means advantageously provides an operator of the remote communication means an up to date indication of the sources of information which are available to them.

The incident response system may comprise interior audio detection means arranged to detect audio interior to the vehicle.

Detection of audio detected interior to the vehicle may allow interior audio (e.g. speech of vehicle occupant) to be transmitted to the remote communication means. Additionally or alternatively the audio detected interior to the vehicle may be used to determine whether or not to transmit audio detected exterior to the vehicle to the remote communication means.

Audio detected interior to the vehicle may be subjected to noise reduction or cancellation. For example, detected audio at one or more frequencies may be suppressed in order to reduce or cancel the presence of noise in the audio detected interior to the vehicle. Such noise cancelling may be applied in order to "clean up" the detected audio so that the speech of a vehicle occupant interior to the vehicle is more clearly audible in the detected audio. Such noise cancellation may be applied in order for the quality of the audio transmitted to a remote communication means to comply with relevant standards or regulations for incident response systems. However, applying noise reduction or cancellation to audio which is detected interior to the vehicle may render any audio originating outside of the vehicle inaudible in the audio which is sent to a remote communication means. Consequently speech or cries for help from people situated exterior to the vehicle may not be audible in the audio detected interior to the vehicle, which is sent to the remote communication means.

The control means may be arranged to transmit the audio detected interior to the vehicle to the remote communication means over the established audio communication.

Transmission of audio detected interior to the vehicle provides additional information to an operator of the remote communication means. For example, the operator may be able to hear speech and conduct a conversation with a vehicle occupant situated inside the vehicle. This provides additional information to the operator in order to assess the nature and severity of the vehicle incident.

The control means may be arranged to combine the audio detected interior to the vehicle and the audio detected exterior to the vehicle and transmit the combined audio to the remote communication means.

Combination of interior and exterior audio advantageously allows an operator of the remote communication means to simultaneously hear audio from inside of the vehicle (e.g. conversation of or with a vehicle occupant) and audio from outside of the vehicle, facilitating communication with someone outside of the vehicle such as a bystander who may have witnessed the incident. This allows the operator to continually assess the vehicle incident using all available information.

The control means may be arranged to combine the audio detected exterior to the vehicle with audio detected interior to the vehicle at a signal level such that a vehicle occupant speaking interior to the vehicle is audible in the combined audio.

Audio exterior to the vehicle may be of a relatively high volume (e.g. traffic noise, sirens etc.) compared to audio interior to the vehicle. Combining the interior and exterior audio at signal levels which allow a vehicle occupant's speech to be audible in the combined audio advantageously allows an operator of the remote communication device to hear and understand the vehicle occupant's speech without it being drowned out by audio exterior to the vehicle.

The exterior audio detection means may comprise a microphone situated exterior to a vehicle cabin.

This provides a convenient manner in which to detect audio exterior to the vehicle. In some embodiments audio detected exterior to the vehicle may be detected by one or more microphones situated exterior to the vehicle cabin for other auxiliary purposes. For example, audio detected exterior to the vehicle may be used to cancel road noise from audio reproduced inside of the vehicle (e.g. by a communication and/or entertainment system).

The microphone may, for example, be situated on the exterior of the vehicle (e.g. affixed to the exterior of the vehicle).

The microphone may be situated proximate to a wheel arch of the vehicle.

The wheel arch of a vehicle provides a convenient location for the positioning of a microphone. For example, the wheel arch may serve to protect the microphone from significant damage during a vehicle collision. A wheel arch may also provide a convenient location for detecting audio to be used for other auxiliary purposes, such as cancelling road noise from audio reproduced interior to the vehicle.

The exterior audio detection means may comprise a microphone situated interior to the vehicle and acoustically coupled with the exterior of the vehicle.

Situating a microphone interior to the vehicle may provide protection for the microphone in the event of a vehicle collision and may reduce the chances of damage to the microphone in the event of a vehicle collision. Additionally or alternatively situating a microphone interior to the vehicle may provide protection from outside elements such as moisture and extreme temperatures, which may otherwise cause damage to a microphone.

The exterior audio detection means may comprise an acoustic tube arranged to acoustically couple the microphone with the exterior of the vehicle.

An acoustic tube provides a convenient means by which audio exterior to the vehicle may be transmitted to a microphone situated interior to the vehicle so as to allow the microphone to detect audio exterior to the vehicle.

According to a still further aspect of the invention there is provided an incident response system for a vehicle as described above, wherein: the incident detection means comprises a sensor for detecting an event indicative of an incident and for outputting a signal indicative of the detection of an incident; the exterior audio detection means comprises an audio sensor arranged to detect audio exterior to the vehicle; the communication means comprises an antenna operable to transmit and receive signals in the form of electromagnetic radiation so as to allow wireless communication with a remote device; and the control means comprises a processor.

Detection of an event indicative of a vehicle incident may comprise detection of operation (e.g. by a vehicle occupant) of an actuator (such as a button or lever) for indicating that a vehicle incident has occurred (such as a collision). For example, the incident detection means may comprise a sensor arranged to detect operation of an actuator (for example, compression of a button or movement of a lever).

Additionally or alternatively, detection of an event indicative of a vehicle incident may comprise detection that the vehicle has undergone an event indicative of an incident. The event may, for example, comprise one or more of a sudden deceleration, sudden braking and/or collision of the vehicle. The incident detection means may comprise one or more sensors arranged to detect one or more properties of the vehicle. For example, one or more sensors may be arranged to detect acceleration and/or deceleration of the vehicle and/or of components of the vehicle. Additionally or alternatively, one or more sensors may be arranged to detect collision of all or part of the vehicle with another object. The incident detection means may further comprise a controller arranged to receive inputs from one or more sensors and deduce from the one or more inputs, whether an event indicative of a vehicle incident has occurred.

The incident detection means may output an incident signal upon detection of an event indicative of a vehicle incident. The incident signal may be received by the control means.

The incident detection means may form part of an airbag system for activation of one or more airbags in dependence on detection of an event indicative of an incident.

In addition to the communication of audio with a remote communication means, the control means may be operable to communicate other forms of data with the remote communication means. For example, the vehicle may include one or more sensors for detecting the geographical location of the vehicle (e.g. in the form of GPS coordinates) and the control means may be operable to communicate the detected location to the remote communication means.

The remote communication means may, for example, comprise a device (e.g. a telephone and/or a computer) situated at a call centre for receiving emergency calls. The remote communication means may be operated by an operator who is in communication with an emergency response service for attending the site of emergencies (e.g. a fire, police and/or ambulance service).

The communication means be may be arranged to support a communication channel between the vehicle and a remote communication means by any suitable means. For example, a communication channel may be established over a telecommunications network operating according to one or more telecommunications protocols such as Global System for Mobile Communications (GSM), 3G, Long Term Evolution (LTE), LTE-Advanced or LTE Advanced Pro etc.

According to a still further aspect of the invention there is provided a controller for a vehicle incident response system, the controller comprising: input means for receiving an incident signal indicative of detection of a vehicle incident event; control means arranged to generate a control signal for causing a communication means to establish an audio communication channel between a vehicle and a remote communication means in dependence on receiving the incident signal and selectively transmit an audio signal to the remote communication means over the established audio communication channel, wherein the audio signal is indicative of audio detected exterior to the vehicle; and output means for outputting the generated control signal.

The input means may be suitable for receiving the audio signal indicative of audio detected exterior to the vehicle. The control means may communicate the audio signal as part of the generated control signal. Alternatively, the control means may generate a control signal which causes the audio signal to be routed to the communication means for communication to the remote communication means. In such an embodiment, the audio signal may not be received at the input means.

The output means may output the generated control signal to the communication means.

The control means may be arranged to determine whether a signal level of audio detected interior to the vehicle is less than a threshold signal level and generate the control signal for causing the communication means to transmit the audio signal indicative of audio detected exterior to the vehicle to the remote communication means in dependence on the signal level of the audio detected interior to the vehicle being less than the threshold signal level.

The control means may be operable to receive a request from the remote communication means for audio detected exterior to the vehicle and generate the control signal for causing the communication means to transmit the audio signal indicative of audio detected exterior to the vehicle to the remote communication means in dependence on the request.

The control means may be arranged to generate a control signal for causing the communication means to communicate to the remote communication means an indication that audio detected exterior to the vehicle is available.

The control means may be arranged to determine whether an exterior audio detection means is functioning.

Determining whether the exterior audio detection means is functioning may comprise determining whether data is being received from the exterior audio detection means.

The control means may be arranged to generate a control signal for causing the communication means to communicate to the remote communication means an indication that audio detected exterior to the vehicle is available if the control means detects that the exterior audio detection means is functioning and generate a control signal for causing the communication means to communicate to the remote communication means an indication that audio detected exterior to the vehicle is not available if the control means detects that the exterior audio detection means is not functioning.

The control means may be arranged to generate a control signal for causing a communication means to transmit an audio signal to the remote communication means over the established audio communication channel wherein the audio signal is indicative of audio detected interior to the vehicle.

The control means may be arranged to generate an audio signal indicative of a combination of the audio detected interior to the vehicle and the audio detected exterior to the vehicle.

The audio detected exterior to the vehicle may be combined with audio detected interior to the vehicle at a signal level such that a vehicle occupant speaking interior to the vehicle is audible in the combined audio.

According to a still further embodiment of the invention there is provide a vehicle comprising an incident response system or the controller as described above.

According to a still further aspect of the invention there is provided a method of responding to a vehicle incident, the method comprising: detecting an event indicative of a vehicle incident; establishing an audio communication channel between the vehicle and a remote communication means in dependence on the detection of the event indicative of the vehicle incident; detecting audio exterior to the vehicle and selectively transmitting the detected audio to the remote communication means over the audio communication channel.

The method may comprise detecting audio interior to the vehicle; determining whether a signal level of the audio detected interior to the vehicle is less than a threshold signal level; and transmitting the audio detected exterior to the vehicle to the remote communication means if it is determined that the signal level of the audio detected interior to the vehicle is less than the threshold signal level.

The method may comprise: receiving a request from the remote communication means for audio detected exterior to the vehicle; and transmitting the audio detected exterior to the vehicle to the remote communication means, in dependence on the request.

The method may comprise communicating to the remote communication means an indication that audio detected exterior to the vehicle is available.

The method may comprise determining whether audio exterior to the vehicle is being detected.

The method of may comprise communicating to the remote communication means an indication that audio detected exterior to the vehicle is available if it is detected that audio exterior to the vehicle is being detected and communicating to the remote communication means an indication that audio detected exterior to the vehicle is not available if it is detected that audio exterior to the vehicle is not being detected.

The method may comprise detecting audio interior to the vehicle.

The method may comprising transmitting the audio detected interior to the vehicle to the remote communication means over the established audio communication channel.

The method may comprise combining the audio detected interior to the vehicle and the audio detected exterior to the vehicle and transmitting the combined audio to the remote communication means.

The method may comprise combining the audio detected exterior to the vehicle with audio detected interior to the vehicle at a signal level such that a vehicle occupant speaking interior to the vehicle is audible in the combined audio.

According to a still further aspect of the invention there is provide computer software which, when executed by a computer, is arranged to perform a method as described above. Optionally the computer software is stored on a computer readable medium. The computer readable medium may comprise a non-transitory computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
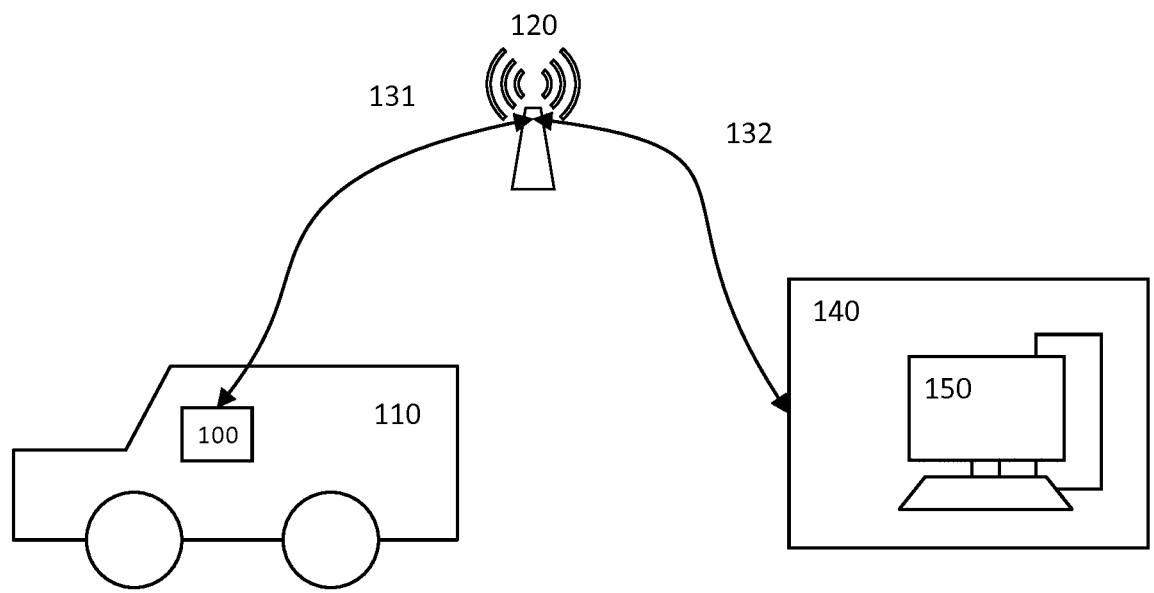
FIG. 1 is a schematic illustration of a vehicle according to an embodiment of the invention, the vehicle being in communication with a remote communication means.

FIG. 1 schematically illustrates operation of a vehicle 110 according to an embodiment of the invention. The vehicle 110 includes an incident response system (IRS) 100. The IRS 100 may be integrated with the vehicle 110 i.e. form an integral part of the vehicle's systems, or may be a removable device that is at least temporarily associated with the vehicle 110, such as communicably coupled with the vehicle 110 via a wired or wireless connection thereto. The vehicle 110 is illustrated in FIG. 1 as being a land-going vehicle, although it will be appreciated that embodiments of the invention are not limited in this respect and the vehicle may be a watercraft or aircraft, for example.

As will be explained in detail below, the IRS 100 is arranged to detect an event indicative of a vehicle incident and establish an audio communication channel between the vehicle 110 and a remote communication means 150 in dependence on the detection of a vehicle incident event. A vehicle incident may, for example, comprise a collision between the vehicle 110 and another object (such as another vehicle, a wall, a tree or any other object), a fire or submergence of the vehicle. It will be appreciated that other vehicle incidents may be envisaged. For example, a vehicle incident may comprise a vehicle fault or vehicle breakdown.

In the embodiment shown in FIG. 1, the remote communication means 150 comprises a remote computer system 150. In other embodiments the remote communication means 150 may comprise other forms of remote communication device such as a landline or mobile telephone. The communication means 150 is located at a location remote from the vehicle 110 and may therefore be referred to as a remote device 150. The remote device 150 may be located in a remote call centre 140. In some embodiments at least one human operator is present in the call centre 140 to monitor an output of the remote device 150 and to attempt to communicate with one or more occupants of the vehicle 110, as will be explained.

The audio communication channel between the vehicle 100 and the remote device 150 may be established over a telecommunications network 120 which allows the IRS 100 to communicate with the remote device 150 whilst the vehicle 110 is mobile. The telecommunications network 120 may operate according to one or more telecommunications protocols such as Global System for Mobile Communications (GSM), 3G, Long Term Evolution (LTE), LTE-Advanced or LTE Advanced Pro, for example. Other telecommunications protocols are envisaged.

The network 120 is operable to provide a communication channel 131, 132 between the IRS 100 and the remote device 150. The communication channel 131, 132 may be formed by a first communication path 131 between the IRS 100 and network 120 and a second communication path 132 between the network 120 and the remote device 150. In the illustrated embodiment the communication channel 131, 132 is bi-directional, as indicated by arrows 131, 132, allowing signals to be sent from IRS 100 to remote device 150 and from the remote device 150 to the IRS 100. However, it will be appreciated that in some embodiments first and second unidirectional channels may be established between the IRS 100 and the remote device 150. In some embodiments a first channel allows signals to be sent from IRS 100 to the remote device 150 whilst a second channel allows signals to be sent from remote device 150 to the IRS 100.

Once established, the communications channel 131, 132 allows audio communication between an operator of the remote device 150 and one or more occupants of the vehicle 110. As described above, the communication channel 131, 132 may be established by the IRS 100 in dependence on detection of an event indicative of a vehicle incident. In the case of a vehicle incident, the establishment of the communications channel 131, 132 may allow one or more vehicle occupants to audibly communicate the nature, status and/or severity of the vehicle incident to an operator of the remote device 150. The operator may further communicate with one or more emergency response services (e.g. police, fire and/or ambulance services) so as to direct the emergency response services to attend the vehicle incident. For example, if the operator deduces from communication with one or more vehicle occupants that the severity of the vehicle incident warrants alerting an emergency response service, then the operator may instruct an emergency response service to attend the vehicle incident.

In addition to the audio communication between the vehicle 100 and the remote device 150, the communications channel 131, 132 may be operable to support other forms of communication. For example, the vehicle 110 may include one or more sensors (e.g. a GPS unit) for detecting the geographical location of the vehicle (e.g. in the form of GPS coordinates) and the IRS 100 may be operable to communicate the detected location to the remote device 150. An operator of the remote device 150 may observe the received geographical location of the vehicle 110 and may communicate the geographical location of the vehicle to one or more emergency response services in order to enable the emergency response services to locate the vehicle 110. In some embodiments other forms of information may be communicated over the communications channel 131, 132.

Figure 2:
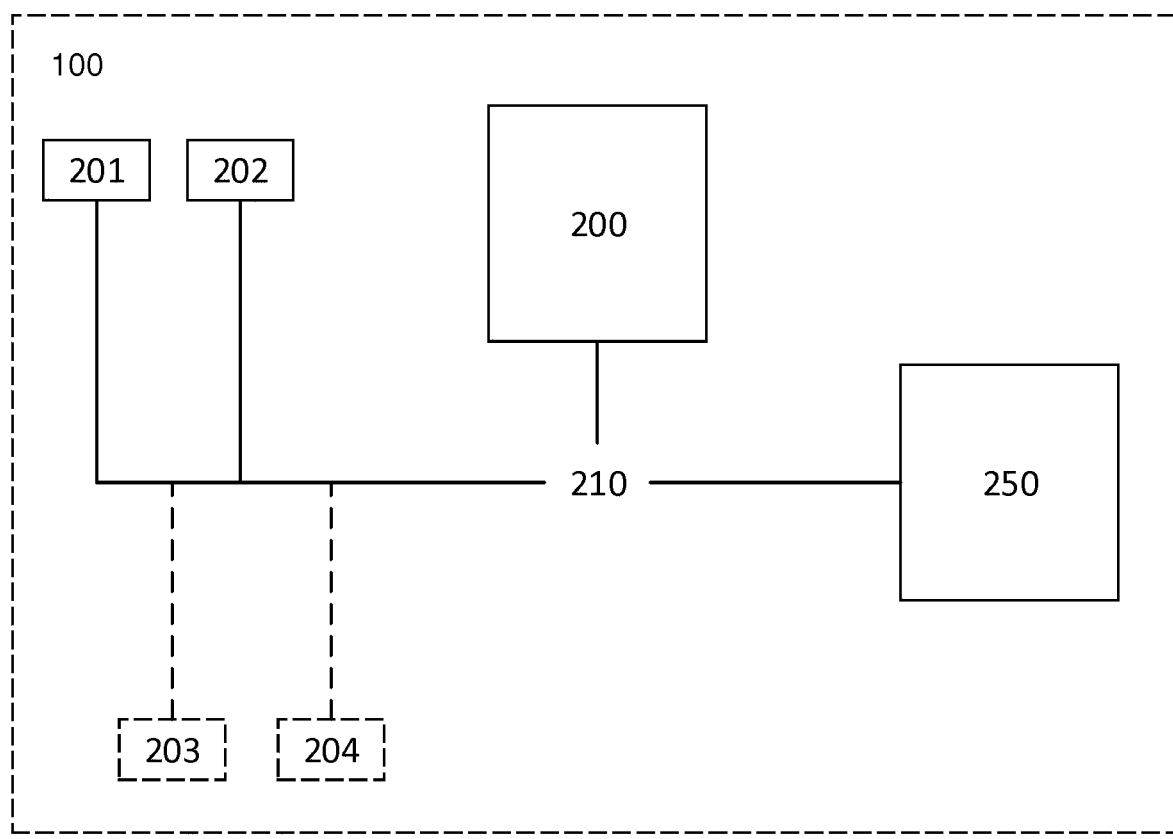
FIG. 2 is a schematic illustration of an incident response system according to an embodiment of the invention.

FIG. 2 is a schematic illustration of an IRS 100 according to an embodiment of the invention. The IRS 100 comprises a control means 200 in the form of a controller 200 according to an embodiment of the invention. The controller 200 may be implemented as an electronic device comprising one or more processors operable to execute computer software instructions which may be stored in a memory accessible to the one or more processors, such as a memory device of the controller 200. The controller 200 may be communicably coupled to a communication bus 210 to exchange, i.e. to send and/or receive data, with other units or modules communicably coupled with the communication bus 210. The communication bus 210 may be implemented by, for example, a communication network such as one of CAN-Bus, Ethernet or Flexray. Other communication networks may be envisaged.

The IRS 100 further comprises exterior audio detection means 201, incident detection means 202, and communication means 250. Optionally, and as shown in the embodiment of FIG. 2, the IRS 100 further comprises interior audio detection means 203 and audio output means 204.

The communication means 250 (e.g. in the form of a communication module 250) is arranged to operatively support a communication channel 131, 132 (e.g. an audio communication channel) with the remote device 150. The communication means 250 may, for example, comprise one or more antennas operable to transmit and/or receive signals in the form of electromagnetic radiation so as to allow wireless communication with the remote device 150 (e.g. over telecommunications network 120). The communication means 250 may operate according to one or more telecommunications protocols such as Global System for Mobile Communications (GSM), 3G, Long Term Evolution (LTE), LTE-Advanced or LTE Advanced Pro. Other telecommunications protocols are envisaged.

The incident detection means 202 is arranged to detect an event indicative of a vehicle incident. Detection of an event indicative of a vehicle incident may comprise detection of operation (e.g. by a vehicle occupant) of an actuator (not shown), such as a button or lever for indicating that a vehicle incident has occurred (such as a collision). For example, the incident detection means may comprise a sensor (not shown) arranged to detect operation of an actuator (for example, compression of a button or movement of a lever). An actuator for indicating occurrence of a vehicle incident may be operated by an occupant of a vehicle which is directly involved in a vehicle incident. Additionally or alternatively, an actuator for indicating occurrence of a vehicle incident may be operated by a person who is not directly involved in a vehicle incident but who witnesses the vehicle incident.

Additionally or alternatively, detection of an event indicative of a vehicle incident may comprise detection that the vehicle 110 has undergone an event indicative of a vehicle incident. The event may, for example, comprise one or more of a sudden acceleration or deceleration, sudden braking, vehicle pitch and or roll angle exceeding a predetermined angle, collision of the vehicle 110 and/or fire within the vehicle 110, within an engine bay of the vehicle or within another region associated with the vehicle, such as within a transmission of the vehicle 110. Other forms of vehicle incident detection are useful.

The incident detection means 202 may comprise one or more sensors (not shown) arranged to detect one or more properties of the vehicle 110. For example, one or more sensors (not shown) may be arranged to detect acceleration and/or deceleration of the vehicle 110 and/or of components of the vehicle 110. Additionally or alternatively, one or more sensors (not shown) may be arranged to detect collision of all or part of the vehicle 110 with another object. Additionally or alternatively, one or more sensors (not shown) may be arranged to detect the temperature in one or more regions of the vehicle 110. The incident detection means 202 may further comprise a controller (not shown) arranged to receive inputs from one or more sensors and deduce from the one or more inputs, whether an event indicative of a vehicle incident has occurred. In some embodiments the incident detection means 202 may form part of an occupant restraints system (not shown) for activation of one or more airbags and or pretensioner seatbelt in dependence on detection of an event indicative of a vehicle incident.

The incident detection means 202 may output an incident signal upon detection of an event indicative of a vehicle incident. The incident signal may be received by the controller 200 (e.g. via the communication bus 210). For example, the incident signal may be received at an input means of the controller such as an electrical input electrically connected to the bus 210.

The controller 200 is arranged to control the communication means 250 in dependence on detection of an event indicative of a vehicle incident (by the incident detection means 202) to establish an audio communications channel 131, 132 between the vehicle 110 and the remote device 150. For example, upon detecting an event indicative of a vehicle incident, the incident detection means 202 may output an incident signal which is received at the input means of the controller 200. Upon receiving the incident signal, the controller 200 controls the communication means 250 to establish an audio communication channel 131, 132 with the remote device 150. For example, the controller 200 may output a control signal via an output means thereof such as an electrical output connected to the bus 210, which is received by the communication means 250 (e.g. via communication bus 210), the control signal being configured to cause the communication means 250 to establish an audio communication channel 131, 132 with the remote device 150.

The interior audio detection means 203 is arranged to detect audio interior to the vehicle 110. The interior audio detection means 203 may, for example, comprise one or more audio sensors (such as a microphone) situated inside of the vehicle 110. That is, the interior detection means 203 may comprise one or more audio sensors situated interior to an occupant compartment of the vehicle 110. In some embodiments, the interior audio detection means 203 comprises one or more microphones situated in a headrest of a seat located inside the vehicle. The one or more microphones may be arranged to detect speech of an occupant of the vehicle. In other embodiments, the interior audio detection means 203 may comprise one or more microphones situated at other locations inside the vehicle and arranged to detect speech of an occupant of the vehicle.

The controller 200 may be arranged to transmit audio detected interior to the vehicle 110 (by the interior audio detection means 203) to the remote device 150 over the established audio communications channel 131, 132. For example, the interior audio detection means 203 may output an audio signal indicative of audio detected interior to the vehicle which may be sent to the communication means 250 for communication to the remote device 150. In some embodiments, the controller 250 may be arranged to route the audio signal from the interior audio detection means 203 to the communication means 250 (e.g. via the communication bus 210). In other embodiments, the audio signal may be received at an input of the controller 200 and the controller 200 may output the audio signal to the communication means (e.g. via the communication bus 210). Audio may be communicated in the form of data packets sent over the bus 210.

Audio detected interior to the vehicle 110, which is communicated to the remote device 150 may be output by the remote device 150 such that it is audible to an operator of the remote device 150. The remote device 150 may be configured to detect audio in the vicinity of the operator of the remote device 150 and may communicate the detected audio to the IRS 100 via the communications channel 131, 132. The detected audio which is received at the IRS 100 may be output by the audio output means 204, which may comprise one or more speakers located inside of the vehicle 100. For example, a signal indicative of the audio detected at the remote device 150 may be received at the communication means 250. The received audio signal may be routed to the audio output means 204 (e.g. by the controller 200 via the communication bus 210) for reproduction by the audio output means 204. This allows speech of an operator of the remote device 150 to be audible to one or more occupants of the vehicle 110.

The audio input means 203, the audio output means 204 and the communication means 250 may allow audio communication between one or more occupants of the vehicle 110 and an operator of the remote device 150. The operator and the one or more occupants may conduct a conversation during which information regarding the vehicle incident can be communicated to the operator so as to enable the operator to direct one or more incident response services as appropriate. However, such a communication mechanism relies on one or more vehicle occupants being present inside of the vehicle 110, or at least audible within an interior of the vehicle 110, and being capable of communication. In some instances of a vehicle incident, one or more occupants of the vehicle following a vehicle incident event may be situated outside of the vehicle when an operator of the remote device 150 attempts to communicate with them. For example, one or more vehicle occupants may have left the vehicle following an incident to seek a safer place to await help and may therefore be situated outside of the vehicle when an operator of the remote device 150 attempts to communicate with them.

In the event that one or more vehicle occupants are situated outside of the vehicle 110 when an operator attempts to communicate with them, the operator's attempts to assess the incident situation by communicating with a vehicle occupant may be unsuccessful. Consequently the operator may not be able to ascertain whether a vehicle occupant has left the vehicle voluntarily, or remains inside the vehicle but is unable to communicate with the operator.

In some embodiments, audio detected interior to the vehicle 110 (e.g. by the interior audio detection means 203) may be subjected to noise reduction or cancellation. For example, detected audio at one or more frequencies may be suppressed in order to reduce or cancel the presence of noise in the audio detected interior to the vehicle 110. Such noise cancelling may be applied in order to enhance or otherwise "clean up" the detected audio so that speech of a vehicle occupant interior to the vehicle is more clearly audible in the detected audio. Such noise cancellation may be applied in order for the quality of the audio communicated to the remote device 150 to comply with relevant standards or regulations for incident response systems. However, applying noise reduction or cancellation to audio which is detected interior to the vehicle 110 may render any audio originating outside of the vehicle inaudible in the audio signal which is sent to a remote device 150. Consequently, speech or calls for help from people situated exterior to the vehicle (or low volume speech of a vehicle occupant situated inside the vehicle) may not be audible in the audio detected interior to the vehicle, which is sent to the remote communication device 150.

In order to allow an operator of the remote device 150 access to improved information regarding a detected vehicle incident, the IRS 100 is configured to selectively transmit audio detected exterior to the vehicle to the remote device 150 over the communication channel 131, 132.

Audio exterior to the vehicle 110 is detected by exterior audio detection means 201, in the form of an audio sensor arranged to detect audio exterior to the vehicle 110. The exterior audio detection means may, for example, comprise one or more microphones situated exterior to a vehicle cabin of the vehicle 110 (e.g. affixed to the exterior of the vehicle). For example, the exterior audio detection means 201 may comprise one or more microphones situated in or otherwise proximate to a wheel arch of the vehicle 110. In some embodiments, the exterior audio detection means 201 may comprise one or a plurality of microphones. Each microphone may be situated in or otherwise proximate to a wheel arch of the vehicle 110. For example, the exterior audio detection means 201 may comprise at least four microphones, each of the four microphones being situated in or otherwise proximate to a different wheel arch of the vehicle 110. In some embodiments one or more microphones may be situated at one or more other locations exterior to the vehicle 110.

In some embodiments, the exterior audio detection means 201 comprises at least one microphone situated interior to the vehicle but acoustically coupled with the exterior of the vehicle 110. For example, the exterior audio detection means 201 may further comprise an acoustic tube arranged to acoustically couple one or more microphones with the exterior of the vehicle 110. An acoustic tube is a waveguide arranged to transmit acoustic waves. The acoustic tube may, for example, comprise a conduit extending between the interior of the vehicle and the exterior of the vehicle and arranged to transmit acoustic waves from the exterior of the vehicle to the one or more microphones situated interior to the vehicle.

Communication of audio detected exterior to the vehicle 110 to the remote device 150 allows an operator of the remote device 150 access to improved information regarding a detected vehicle incident. For example, the operator may be able to deduce a cry for help from the audio detected exterior to the vehicle 110 and may determine based on this information that a severe emergency situation exists. Alternatively, the operator may be able to deduce that people are talking outside of the vehicle and may determine that one or more vehicle occupants at the time of the incident event have voluntarily left the vehicle following the incident event and are not seriously injured. The operator may use the audio detected exterior to the vehicle 110 to provide an improved assessment of the severity and nature of the vehicle incident and may direct one or more incident response services accordingly.

Figure 3:
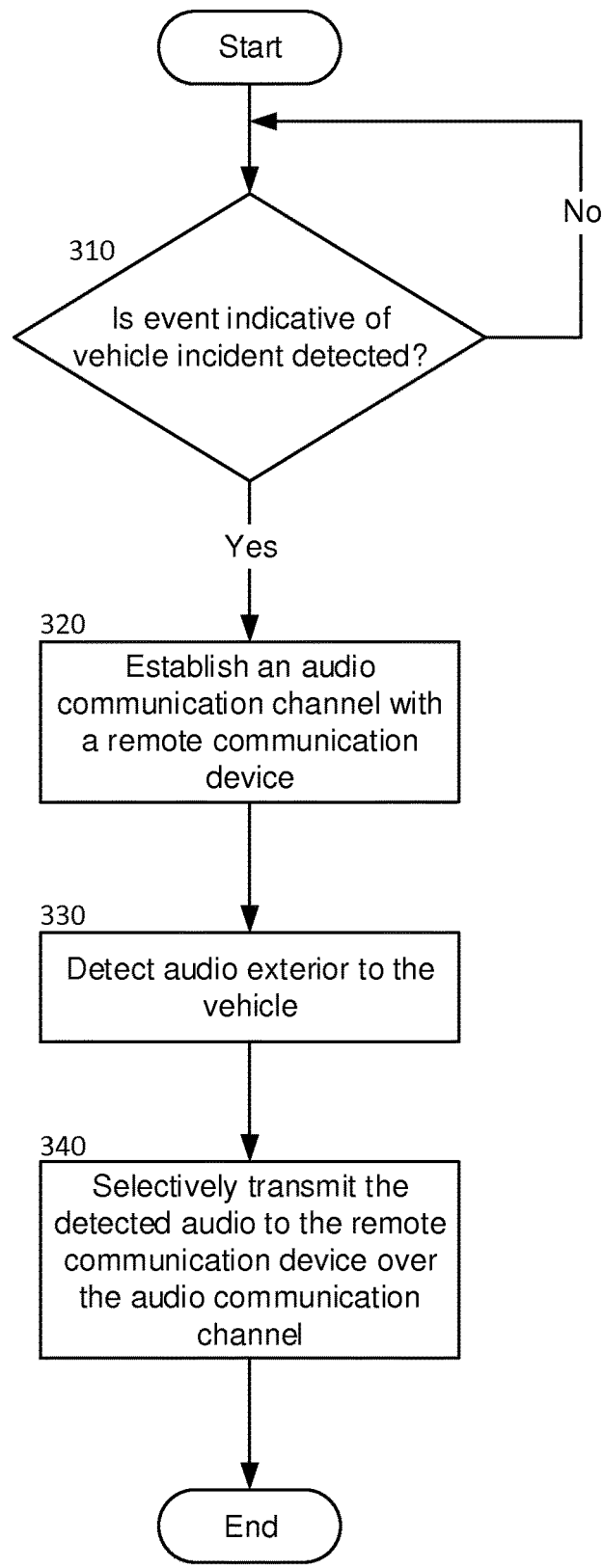
FIG. 3 is a representation of a method according to an embodiment of the invention.

FIG. 3 is a representation of a method according to an embodiment of the invention. At step 310 it is determined whether an event indicative of a vehicle incident is detected. For example, the controller 200 may determine whether the incident detection means 202 detects an event indicative of a vehicle incident. If an event indicative of a vehicle incident is detected, the method moves to step 320 at which an audio communication channel 131, 132 with a remote communication device 150 is established. For example, the controller may control the communication means 250 to establish an audio communication channel 131, 132 with the remote communication device 150 in dependence on detection of an event indicative of a vehicle incident.

At step 330 audio exterior to the vehicle 110 is detected. In some embodiments, audio exterior to the vehicle 110 may be detected in dependence on detection of the event indicative of a vehicle incident. For example, audio exterior to the vehicle 110 may only be detected if a vehicle incident is detected. In other embodiments, audio exterior to the vehicle 110 may be detected regardless of whether a vehicle incident is detected or not. However, audio detected exterior to the vehicle 110 may only be communicated to a remote device 150 if an event indicative of a vehicle incident is detected.

At step 340, audio detected exterior to the vehicle is selectively transmitted to the remote device 150 over the established audio communication channel 131, 132. For example, the controller 200 may control the communication means 250 to selectively transmit audio detected exterior to the vehicle 110 to the remote device 150 over the established communication channel 131, 132.

Figure 4:
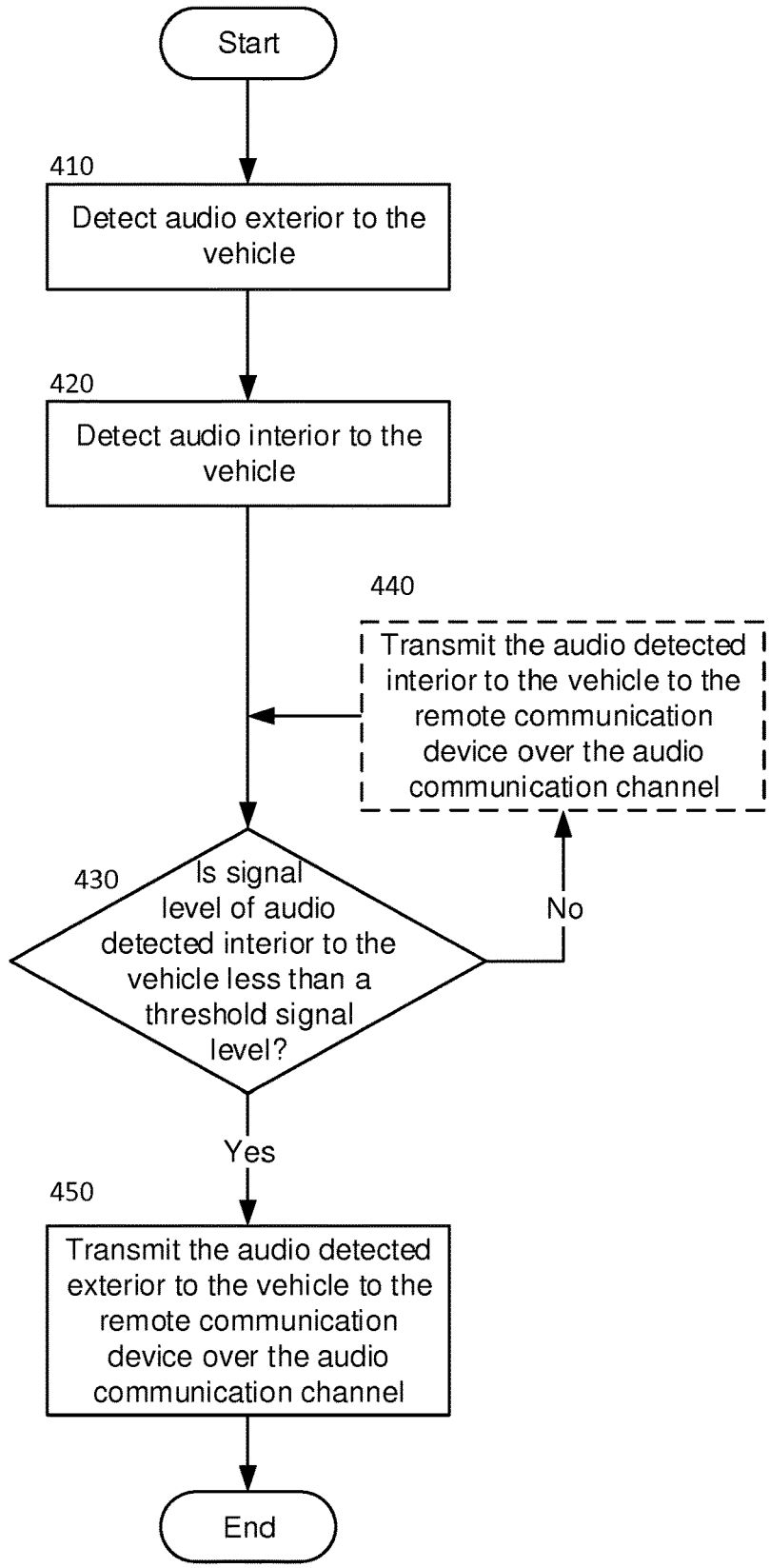
FIG. 4 is a representation of a method of selectively transmitting audio according to an embodiment of the invention.

FIG. 4 is a representation of a method of selectively transmitting audio detected exterior to the vehicle 110 according to an embodiment of the invention. The method represented in FIG. 4 may, in some embodiments, form part of step 340 of the method represented in FIG. 3. Audio exterior to the vehicle 110 and audio interior to the vehicle 110 is detected at steps 410 and 420 respectively. At step 430 it is determined (e.g. by the controller 200) whether a signal level of audio detected interior to the vehicle 110 is less than a threshold signal level. The threshold signal level may, for example, be a signal level at which no speech of a vehicle occupant is audible in the detected audio. For example, if speech of a vehicle occupant is audible in the detected audio then the signal level of the detected audio may be greater than the threshold signal level.

If it is determined that the signal level of audio detected interior to the vehicle is less than a threshold signal level then the method moves to step 450. At step 450 audio detected exterior to the vehicle 110 is transmitted to the remote device 150 over the established audio communication channel 131, 132. For example, the controller 200 may control the communication means 250 to transmit the audio detected by the exterior audio detection means 201 to the remote device 150.

A determination that a signal level of the audio detected interior to the vehicle 110 is less than the threshold signal level may indicate that no speech of a vehicle occupant is being detected interior to the vehicle 110. This may indicate that additional information from outside of the vehicle 110 may be useful to an operator of the remote device 150. For example, it may indicate that one or more occupants of the vehicle 110 at the time of the incident are now outside of the vehicle 110. Transmitting audio detected exterior to the vehicle 110 to the remote communication device in this situation, allows an operator of the remote communication device 110 to access audio which may provide them with useful information regarding the situation outside of the vehicle 110.

In some embodiments (as is shown in dashed lines in FIG. 4), if it is determined that a signal level of audio detected interior to the vehicle 110 is not less than a threshold signal level, then the method proceeds to step 440. At step 440 audio detected interior to the vehicle is transmitted to the remote device 150. If the signal level of audio detected interior to the vehicle 110 is not less than a threshold signal level, this may indicate that speech of a vehicle occupant is audible in the detected audio. In such a situation audio detected exterior to the vehicle may not be required by an operator of the remote device 150 in order to assess the incident situation. The IRS 100 may therefore only transmit audio detected interior to the vehicle 110 and may not transmit audio detected exterior to the vehicle 110.

In some embodiments, if it is determined that a signal level of audio detected interior to the vehicle is less than a threshold signal level, then at step 450 audio detected interior to the vehicle may be transmitted in addition to the audio detected exterior to the vehicle. For example, the controller 200 may combine audio detected interior to the vehicle and audio detected exterior to the vehicle and may control the communication means 250 to transmit the combined audio to the remote device 150. This may allow an operator of the remote device 150 to assess the nature of the vehicle incident based on an interpretation of the situation using audio detected exterior to the device and on audio detected interior to the device.

The control means 250 may combine the audio detected exterior to the vehicle with audio detected interior to the vehicle at a signal level such that a vehicle occupant speaking interior to the vehicle is audible in the combined audio. This will ensure that if a vehicle occupant is situated interior to the vehicle, their speech will remain audible to an operator and will not be drowned out by the audio detected exterior to the vehicle 150.

Figure 5:
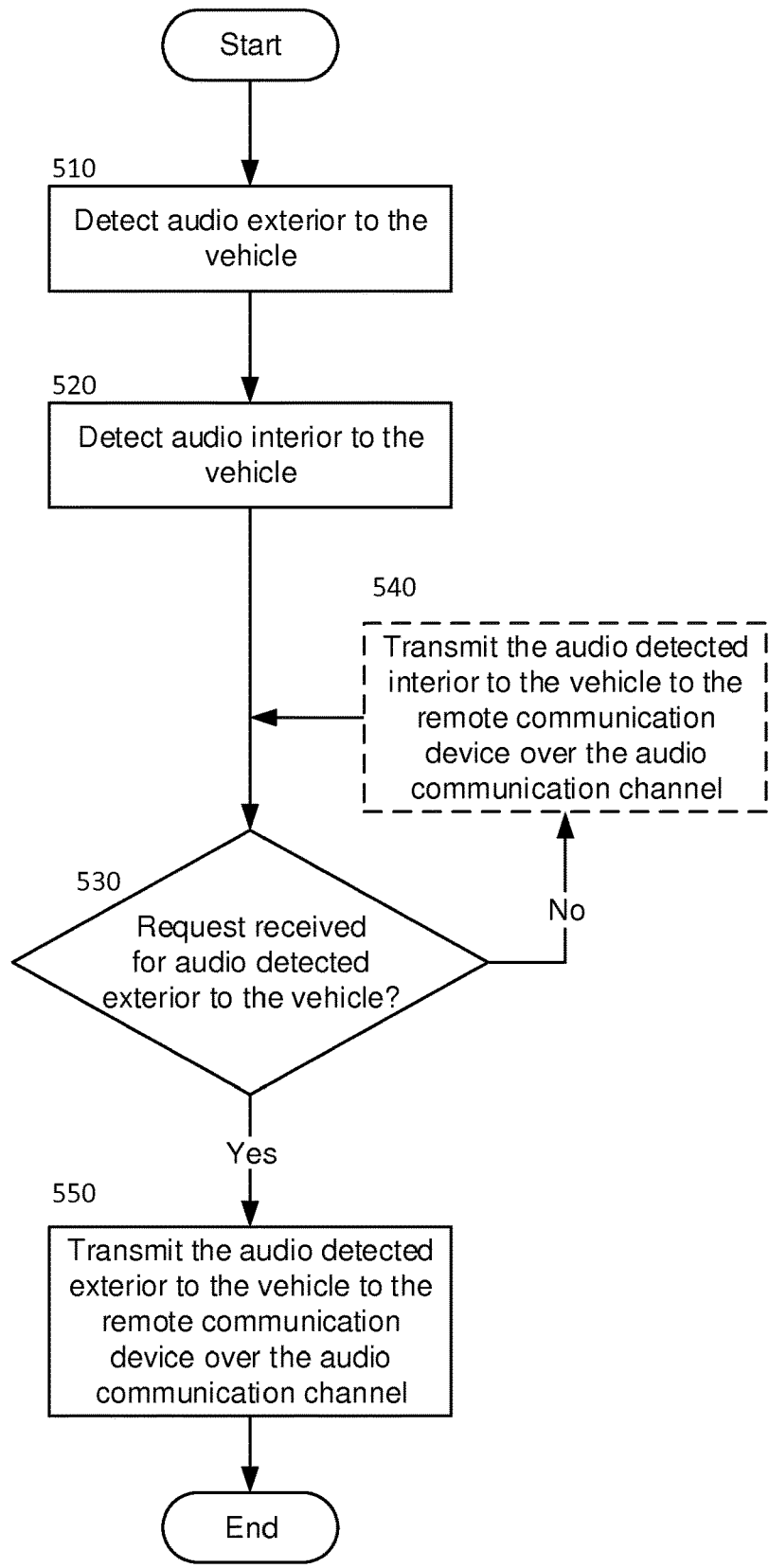
FIG. 5 is a representation of a method of selectively transmitting audio according to another embodiment of the invention.

FIG. 5 is a representation of a method of selectively transmitting audio detected exterior to the vehicle 110 according to another embodiment of the invention. The method represented in FIG. 5 may, in some embodiments, form part of step 340 of the method represented in FIG. 3. Audio exterior to the vehicle 110 and audio interior to the vehicle 110 is detected at steps 510 and 520 respectively. At step 530 it is determined (e.g. by the controller 200) whether a request for audio detected exterior to the vehicle has been received. For example, the controller 200 may be operable to receive a request from the remote device 150 for audio detected exterior to the vehicle. The request may be received over the communication channel 131, 132 and may be forwarded from the communication means 250 to the controller 200. A request for audio detected exterior to the vehicle may be initiated by an operator of the remote device 150. For example, an operator of the remote device 150 may deduce that the information received at the remote device 150 is insufficient to properly assess the vehicle incident situation. The operator may then request audio detected exterior to the vehicle 110 in order to provide an improved assessment of the incident situation. The operator may, for example, operate a user interface of the remote device 150 so as to cause the remote device to issue a request for audio detected exterior to the vehicle 110 to the IRS 100.

If a request for audio detected exterior to the vehicle 110 is received, the method proceeds to step 550. At step 550 audio detected exterior to the vehicle is transmitted to the remote device 150 over the audio communication channel 131, 132. For example, the controller 200 may control the communication means 250 to transmit audio detected exterior to the vehicle 110 over the communication channel 131, 132.

In some embodiments (as is shown in dashed lines in FIG. 5), if no request for audio detected exterior to the vehicle 110 is received, then the method proceeds to step 540. At step 540 audio detected interior to the vehicle is transmitted to the remote device 150. If no request for audio detected exterior to the vehicle is received, this may indicate that the information being communicated to an operator of the remote device 150 is sufficient to assess the vehicle incident situation (e.g. from audio detected interior to the vehicle alone). In such a situation audio detected exterior to the vehicle may not be required by an operator of the remote device 150 in order to assess the incident situation. The IRS 100 may therefore only transmit audio detected interior to the vehicle 110 and may not transmit audio detected exterior to the vehicle 110.

In some embodiments, if a request for audio detected exterior to the vehicle 110 is received, then at step 550 audio detected interior to the vehicle may be transmitted in addition to the audio detected exterior to the vehicle. For example, the controller 200 may combine audio detected interior to the vehicle and audio detected exterior to the vehicle and may control the communication means 250 to transmit the combined audio to the remote device 150. This may allow an operator of the remote device 150 to assess the nature of the vehicle incident based on audio detected exterior to the device and on audio detected interior to the device.

The control means 250 may combine the audio detected exterior to the vehicle with audio detected interior to the vehicle at a signal level such that a vehicle occupant speaking interior to the vehicle is audible in the combined audio. This will ensure that if a vehicle occupant is situated interior to the vehicle, their speech will remain audible to an operator and will not be drowned out by the audio detected exterior to the vehicle 150.

Whilst the embodiments of FIGS. 4 and 5 have been described separately it will be appreciated that in some embodiments one or more features of the methods of FIGS. 4 and 5 may be combined. For example, in some embodiments the controller 200 may be arranged to cause communication of audio detected exterior to the vehicle 110 in dependence on a determination that a signal level of audio detected interior to the vehicle 110 is less than a threshold signal (as described above with reference to FIG. 4) and in dependence on receiving a request for audio detected exterior to the vehicle 110. That is, the controller 200 may cause communication of audio detected exterior to the vehicle 110 if either a request for audio detected exterior to the vehicle 110 is received or if it is determined that a signal level of audio detected interior to the vehicle 110 is below a threshold signal level.

In some embodiments, the controller 200 may be arranged to communicate to the remote device 150 an indication that audio detected exterior to the vehicle is available. For example, upon establishment of the communication channel 131, 132 between the IRS 100 and the remote device 150, the controller 200 may cause communication of a data set to the remote device 150 over the communication channel 131, 132. The data set may include a flag which indicates whether or not audio detected exterior to the vehicle is available. For example, the flag may be set to "true" if audio detected exterior to the vehicle is available and may be set to "false" if audio detected exterior to the vehicle is not available. The remote device 150 may be arranged to display to an operator of the remote device 150 whether or not audio detected exterior to the vehicle 110 is available. By providing this information to the operator of the remote device 150, the operator knows whether or not audio detected exterior to the vehicle 110 may be requested from the IRS 100 and/or may be expected if, for example, the signal level of audio detected interior to the vehicle is below a threshold signal level.

The controller 200 may be arranged to determine whether the exterior audio detection means 201 is functioning. Communication of the indication that audio detected exterior to the vehicle is available may be based upon the determination of whether the exterior audio detection means 201 is functioning. For example, if it is determined that the exterior audio detection means 201 is functioning then the controller 200 may communicate to the remote device 150 an indication that audio detected exterior to the vehicle 110 is available. If it is determined that the exterior audio detection means 201 is not functioning then the controller 200 may communicate to the remote device 150 an indication that audio detected exterior to the vehicle 110 is not available.

In some incident situations the exterior audio detection means 201 could be damaged. For example, if the vehicle 110 is involved in a collision then part or all of the audio detection means 201 could be damaged and may not function. In such situations the controller 200 determines that the exterior audio detection means 201 is not functioning and communicates an indication that audio detected exterior to the vehicle 110 is not available to the remote device 150.

Determining whether the exterior audio detection means 201 is functioning may, for example, comprise determining whether data is being received from the exterior audio detection means 201. For example, during normal operation the exterior audio detection means 201 may be arranged to send data packets to the controller 200 (e.g. via the communication bus 210) on a regular basis. If the controller 200 receives data packets from the exterior audio detection means 201, then the controller 200 may determine that the external audio detection means 201 is functioning. The controller 20 may then communicate an indication that audio detected exterior to the vehicle 110 is available. If the controller does not receive data packets from the exterior audio detection means 201 then the controller 200 may determine that the external audio detection means 201 is not functioning. The controller 20 may then communicate an indication that audio detected exterior to the vehicle 110 is not available.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An incident response system for a vehicle, the incident response system comprising:
    incident detection means arranged to detect an event indicative of a vehicle incident;
    interior audio detection means comprising a microphone situated inside of a cabin of the vehicle and arranged to detect audio interior to the vehicle;
    exterior audio detection means comprising a microphone situated exterior to the vehicle cabin and arranged to detect audio exterior to the vehicle;
    communication means for operatively supporting an audio communication channel with a remote communication means; and
    control means arranged to:
        control the communication means based on the detection of an event indicative of a vehicle incident, to establish an audio communication channel between the vehicle and the remote communication means, wherein the control means is operable to cause selective transmission of the audio detected exterior to the vehicle to the remote communication means over the established audio communication channel;
        determine whether a signal level of the audio detected interior to the vehicle is less than a threshold signal level; and
        transmit the audio detected exterior to the vehicle to the remote communication means based on the signal level of the audio detected interior to the vehicle being less than the threshold signal level.

2. The incident response system of claim 1, wherein the control means is operable to receive a request from the remote communication means for audio detected exterior to the vehicle and transmit the audio detected exterior to the vehicle to the remote communication means based on the request.

3. The incident response system of claim 1, wherein the control means is arranged to communicate to the remote communication means an indication that audio detected exterior to the vehicle is available.

4. The incident response system of claim 1, wherein the control means is arranged to determine whether the exterior audio detection means is functioning.

5. The incident response system of claim 4, wherein determining whether the exterior audio detection means is functioning comprises determining whether data is being received from the exterior audio detection means.

6. The incident response system of claim 4, wherein the control means is arranged to communicate to the remote communication means an indication that audio detected exterior to the vehicle is available if the control means detects that the exterior audio detection means is functioning and communicate to the remote communication means an indication that audio detected exterior to the vehicle is not available if the control means detects that the exterior audio detection means is not functioning.

7. The incident response system of claim 1, wherein the control means is arranged to transmit the audio detected interior to the vehicle to the remote communication means over the established audio communication channel.

8. The incident response system of claim 7, wherein the control means is arranged to combine the audio detected interior to the vehicle and the audio detected exterior to the vehicle and transmit the combined audio to the remote communication means.

9. The incident response system of claim 8, wherein the control means is arranged to combine the audio detected exterior to the vehicle with audio detected interior to the vehicle at a signal level such that a vehicle occupant speaking interior to the vehicle is audible in the combined audio.

10. The incident response system of claim 1, wherein the microphone is situated proximate to a wheel arch of the vehicle.

11. A controller for a vehicle incident response system, the controller comprising:
    input means for receiving an incident signal indicative of detection of a vehicle incident event;
    control means arranged to:
        generate a control signal for causing a communication means to establish an audio communication channel between a vehicle and a remote communication means in dependence on receiving the incident signal and selectively transmit an audio signal to the remote communication means over the established audio communication channel, wherein the audio signal is indicative of audio detected exterior to the vehicle by a microphone situated exterior to a vehicle cabin, wherein the vehicle further comprises a microphone situated inside of the vehicle cabin which is arranged to detect audio interior to the vehicle;
        determine whether a signal level of the audio detected interior to the vehicle is less than a threshold signal level; and
        transmit the audio detected exterior to the vehicle to the remote communication means based on the signal level of the audio detected interior to the vehicle being less than the threshold signal level; and
    output means for outputting the generated control signal.

12. A vehicle comprising the incident response system of claim 1.

13. A method of responding to a vehicle incident, the method comprising:
    detecting an event indicative of a vehicle incident;
    establishing an audio communication channel between the vehicle and a remote communication means based on the detection of the event indicative of the vehicle incident;
    detecting audio interior to the vehicle using a microphone situated inside of a vehicle cabin;
    detecting audio exterior to the vehicle using a microphone situated exterior to the vehicle cabin and selectively transmitting the detected audio to the remote communication means over the audio communication channel;
    determining whether a signal level of the audio detected interior to the vehicle is less than a threshold signal level; and
    transmitting the audio detected exterior to the vehicle to the remote communication means if it is determined that the signal level of the audio detected interior to the vehicle is less than the threshold signal level.

14. Computer software which, when executed by a computer, is arranged to perform a method according to claim 13.

* * * * *